United States Patent

Lien

[11] Patent Number: 5,787,168
[45] Date of Patent: Jul. 28, 1998

[54] MOBILE TELEPHONE FASTENING WITH VIBRATION FUNCTION

[76] Inventor: Wan-yin Lien, 4th Fl.-8, No. 4 Lane 609, Sec. 5, Chunghsin Rd., Sanchung City, Taipei Hsien, Taiwan

[21] Appl. No.: 798,720

[22] Filed: Feb. 12, 1997

[51] Int. Cl.⁶ .............................. H04M 1/00; H04B 1/38; G08B 5/22
[52] U.S. Cl. .................. 379/455; 379/446; 379/454; 455/90; 340/825.46
[58] Field of Search .......................... 379/446, 426, 379/454, 455; 455/567, 575, 90, 344, 347, 348, 351; 340/825.46, 407.1

[56] References Cited

U.S. PATENT DOCUMENTS 5,353,017  10/1994  Suzuki et at. ............... 340/825.46
5,610,979   3/1997  Yu ............................... 379/455

Primary Examiner—Krista Zele
Assistant Examiner—Shihwen Hsieh
Attorney, Agent, or Firm—Sheridan Ross P.C.

[57] ABSTRACT

A mobile telephone fastening with vibration function includes a cramp and a body combined by a casing and a cover. The cramp is adhered to a back of the mobile telephone and has a projection formed on a rear face to be engaged with the body. The body has a printed circuit board, a battery, and a motor with an eccentric wheel respectively received in appropriate cavities defined by the casing and the cover. When a telephone call is received by the mobile telephone, the printed circuit board receives the signal and drives the motor to operate, which in turn rotate the eccentric wheel to produce a vibration to inform the user of the incoming telephone call.

2 Claims, 4 Drawing Sheets

MOBILE TELEPHONE FASTENING WITH VIBRATION FUNCTION

The present invention relates to a mobile telephone fastening, and more particularly to a mobile telephone fastening which not only can provide the user with an excellent secure retention of the mobile telephone, but also can inform the user of an incoming phone call by vibrations, instead of ringing.

BACKGROUND INFORMATION

Mobile telephones are advanced communication tools and are popularly used by many persons. Though it is convenient for persons to communicate with each other by mobile phone, there is a disadvantage that it is inconvenient to carry such phones. A conventional mobile telephone needs to be set in a cover, then the cover is attached to the belt of a user. This kind of fastening after a long time use may cause the mobile telephone to separate from the belt. A second disadvantage is that the mobile telephone will generate a ringing alarm to inform the user of an incoming phone call. The ringing alarm may disturb other persons if the user is in a meeting or a movie theater.

The present invention provides for an improved mobile telephone fastening with vibration function to mitigate and/ or obviate the aforementioned problems.

SUMMARY OF THE INVENTION

One object of the present invention is to provide a mobile telephone fastening which not only can provide the user with an excellent secure attachment of the mobile telephone, but also can inform the user of an incoming telephone call with vibrations, instead of ringing.

In accordance with one aspect of the present invention, a mobile telephone fastening with vibration function comprises a cramp and a body combined by a casing and a cover. The cramp adheres to a back of the mobile telephone and has a projection formed on a rear face. The casing has an outer face defining a longitudinal slot therein for receiving the projection of the cramp, and an inner face having an inner wall extending from an appropriate position thereof. The inner wall defines a chamber. The chamber has a stop extending from a middle point thereof and a passage communicates the chamber with the longitudinal slot. The cover has a back face with a clip mounted thereto and a front face. The front face has a plurality of bosses extending therefrom to engage with a resilient strip. The resilient strip defines a large hole therein.

A plunger is slidably and partly received within the chamber. The plunger has a button formed at an upper end thereof to be receivable within the chamber. The plunger defines a hole aligned with the stop of the casing and has two opposed protrusions integrally extending from an inner periphery defining the hole. The two opposed protrusions abut a lower face of the stop of the casing to limit the upward movement of the plunger. A lower end of the plunger defines an inverted-U-shaped cutout, which defines a bottom face and two side walls. The bottom face has a post extending downward therefrom for a spring to be mounted thereon. Each of the two side walls of the cut-out have a beveled edge at a bottom end thereof.

An insert is received within the passage of the casing. The insert has a slanted front face projecting from the outer face of the casing, a lug integrally formed on a rear face thereof and received in the plunger, and two side protrusions abutting the beveled edge of the plunger.

A printed circuit board, a battery, and a motor with an eccentric wheel are respectively received in appropriate cavities defined by the inner face of the casing and the front face of the cover. A pivotable piece is mounted behind the printed circuit board. The pivotable piece is connected to a link and extends through a slot on the casing to the chamber.

In accordance with another aspect of the present invention, the body further includes a test key mounted at a side wall thereof. The test key is engaged with the printed circuit board.

Other objects, advantages and novel features of the of the invention will become more apparent from the following detailed description when taken in conjunction with the accompanying drawings.

DETAILED DESCRIPTION OF THE PREFERRED EMBODIMENTS

Figure 1:
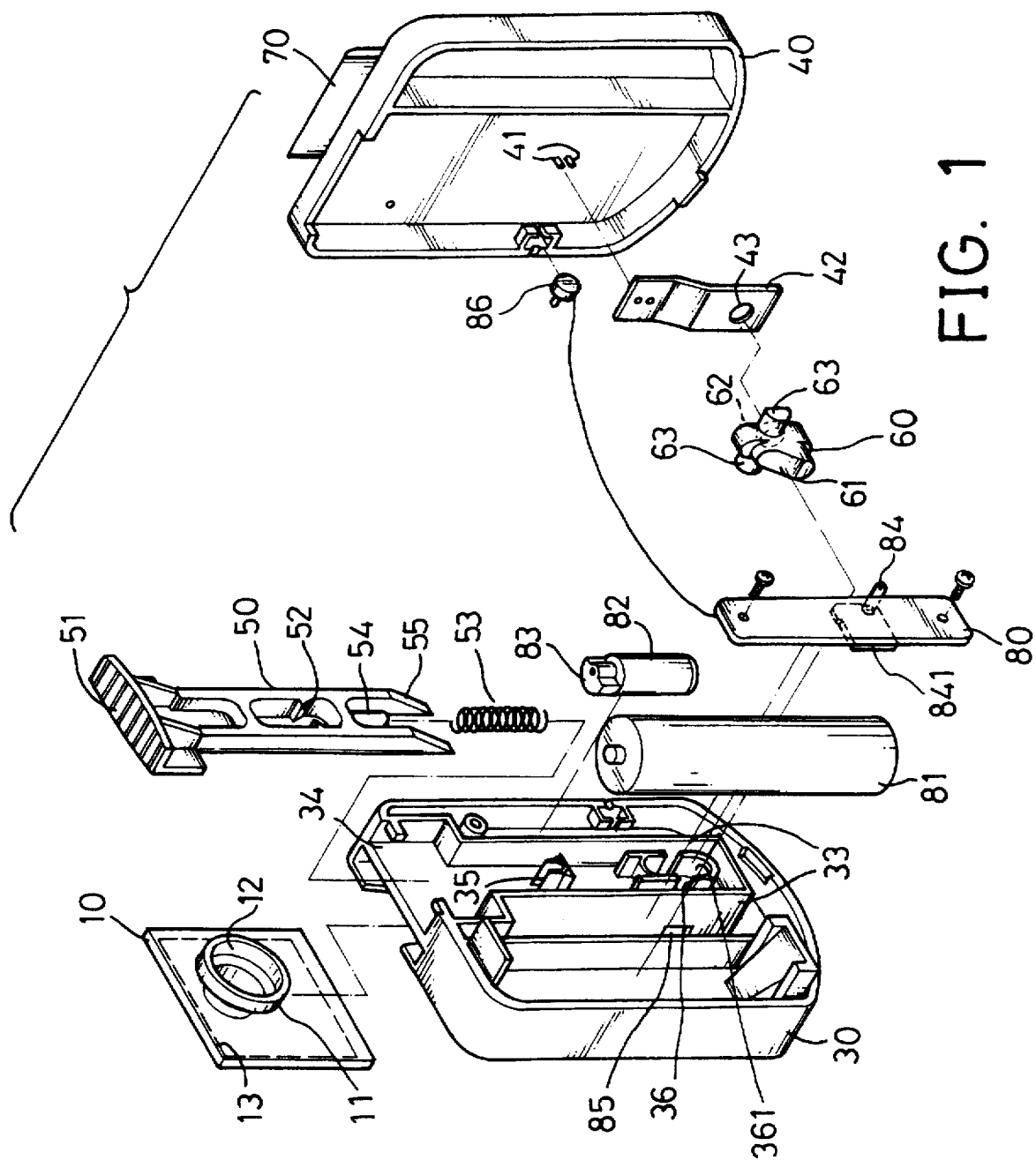
FIG. 1 is an exploded view showing the elements of a mobile telephone fastening with vibration function in accordance with the present invention.
Figure 3:
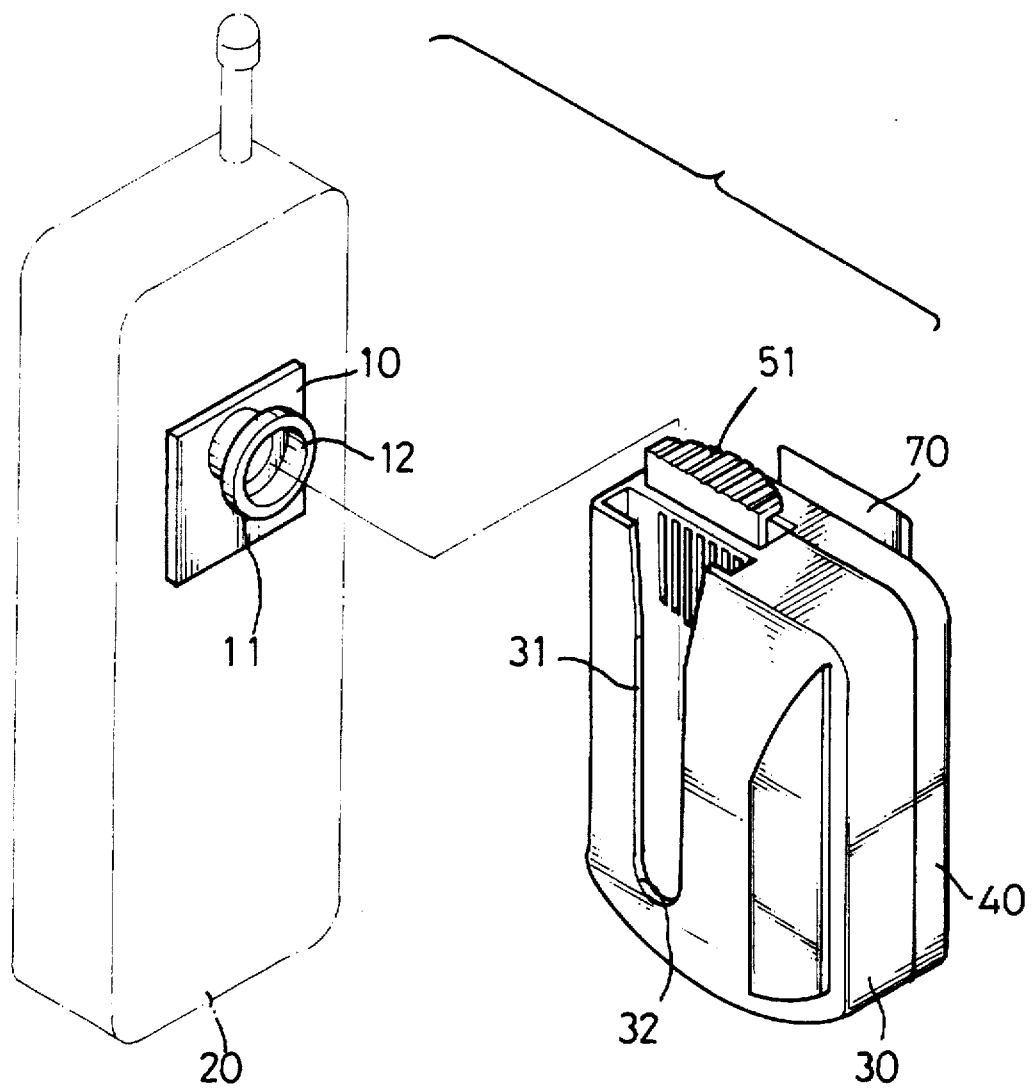
FIG. 3 is a perspective view showing a preferred embodiment of the mobile telephone fastening in accordance with the present invention.

Referring to FIG. 1 and FIG. 3, a mobile telephone fastening with vibration function in accordance with the present invention comprises a cramp 10 and a body including a casing 30 and a cover 40. The cramp 10 has glue at a front face thereof to adhere to a back of the mobile telephone 20 and a projection 11 integrally extending from a rear face thereof. The projection 11 comprises a flange, a neck between the flange and a rear face of the cramp and a bore extending therethrough.

The casing 30 has an outer face (not numbered) defining therein a longitudinal slot 32 with a top open-end for receiving the neck of the projection 11 of the cramp 10. An outer periphery 31 defining the slot 32 is substantially Y-shaped. The casing 30 further has an inner face (not numbered and see FIG. 1). The inner face has an inner wall 33 which defines a T-shaped chamber 34 with an opening at a top end thereof. The chamber 34 is divided into a top portion and a bottom portion perpendicular to the top portion and extending toward a bottom of the casing 30. The bottom portion of the chamber 34 has a stop 35 extending from a middle point thereof and a pair of opposed brackets 36 are integrally formed below the stop 35. The opposed brackets 36 define a passage 361 in communication with the longitudinal slot 32.

A plunger 50 is partly and slidably received within the chamber 34. The plunger 50 has a button 51 formed at an upper end thereof to be received within the top portion of the chamber 34. A top face of the button 51 protrudes beyond the casing 30 and the cover 40, as shown in FIG. 3. The plunger 50 further has a leg (not numbered) integrally extending downward from the button 51. The leg defines a hole in a central portion aligning with the stop 35 of the casing 30. Two opposed protrusions integrally extend from an inner periphery defining the hole and form a retainer 52 to abut a bottom face of the stop 35 of the casing 30 and thus to limit the upward movement of the plunger 50. A lower end of the leg defines an inverted U-shaped cutout, which defines a bottom face and two prongs. A post 54 extends integrally and downwardly from the bottom face of the cut-out such that a spring 53 can be mounted thereon and compressed between the bottom face of the cut-out and a top one of the opposed brackets 36 to provide an upward resiliency to the plunger 50. A lower end of each of the two prongs of the cut-out respectively has a beveled edge 55.

An insert 60 is received in the passage 361 of the casing 30. The insert 60 is substantially cruciform and has a slanted front face 61 which projects from the outer face of the casing 30 into the slot 32 when received therein, a lug 62 integrally formed on a rear face thereof, and two side protrusions 63 respectively formed at both sides thereof. The two side protrusions 63 abut the beveled edges 55 of the plunger 50. When the button 51 of the plunger 50 is pressed downward by a user, the two beveled edges 55 will urge against the two side protrusions 63 of the insert 60 and accordingly urge the slanted front face 61 of the insert 60 out of the passage 36 of the casing 30.

Figure 4:
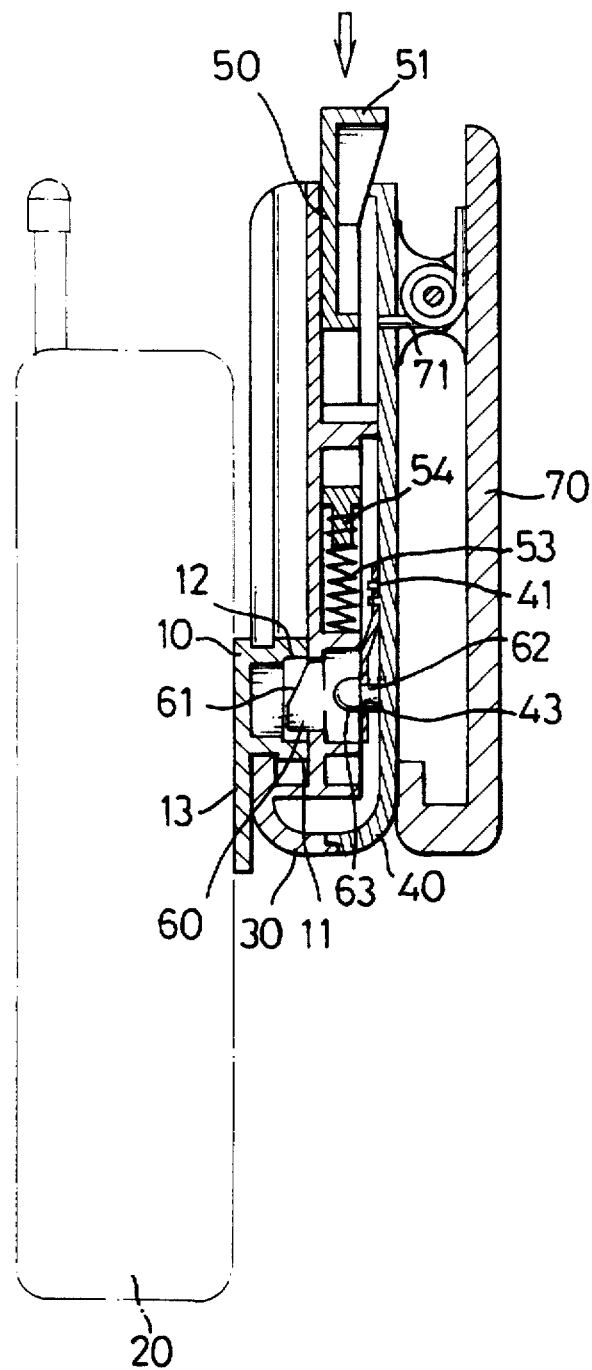
FIG. 4 is a side cross-sectional view showing a combined structure of the mobile telephone fastening of FIG. 1.

The cover 40 has a back face and a front face. With a reference to FIG. 4, the back face has a clip 70 mounted thereto and a torsional spring 71 is disposed between the clip 70 and the back face such that the user can use the clip 70 to grip a waistband or a belt.

Still referring to FIG. 1, the front face of the cover 40 has a plurality of bosses 41 extending from an appropriate portion therefrom. A resilient strip 42 defines a plurality of holes in an upper portion thereof and the holes correspond to the plurality of bosses 41 such that the resilient strip 42 can be mounted to the front face of the cover 40. The resilient strip 42 further defines a large hole 43 in a lower portion thereof to receive the lug 62 of the insert 60 therein and thus to provide a pushing force to urge the insert 60 into the passage 361.

Figure 2:
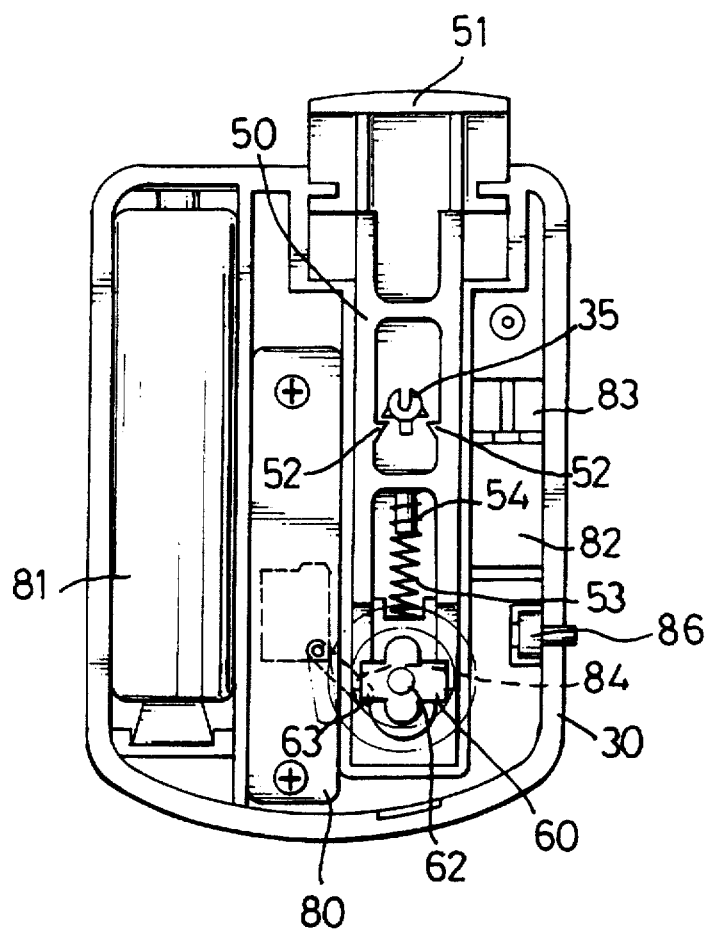
FIG. 2 is a view showing the structure of a casing of the mobile telephone fastening of FIG. 1 with a cover thereof removed.

In addition, a printed circuit board 80, a battery 81, and a motor 82 with an eccentric wheel 83 are respectively received in appropriate cavities defined by the inner face of the casing 30 and the front face of the cover 40. The motor 82, when energized by the battery 81, will rotate the eccentric wheel 83 to produce a vibration. A pivotable piece 84 mounted behind the printed circuit board 80 is connected to a link 841 and extends through a slot 85 in the casing 30 to the chamber 34. When the cramp 10 is inserted into the longitudinal slot 32 in the outer face of the casing 30 and retained beneath the slanted front face 61 of the insert 60, the projection 11 of the cramp 10 will be in contact with and thus displace the pivotable piece 84. In this case, the pivotable piece 84 will be electrically connected to the printed circuit board 80 and act as a switch in an "ON" state. When the cramp 10 is separated from the longitudinal slot 32 of the casing 30, the link 841 and the pivotable piece 84 will return to their initial state and the pivotable piece 84 switches the printed circuit board 80 to be in an "OFF" state, as shown in FIG. 2. Furthermore, a test key 86 is mounted at a side wall of the combined casing 30 and the cover 40. When the printed circuit board 80 is in the ON state, the test key 86 coupled to the printed circuit board 80 can be used to test the electric power, i.e., the battery 81 of the mobile telephone 20.

In operation, the user may mount the mobile telephone 20 to the fastening by means of the cramp 10 being received in the longitudinal slot 32 of the casing 30 and retained beneath the slanted front face 61 of the insert 60. In this case, the projection 11 of the cramp 10 will enable the privotable piece 84 to be electrically connected to the printed circuit board 80. When an incoming phone call signal is received by the mobile telephone 20, the printed circuit board 80 will drive the motor 82 to operate and thus to drive the eccentric wheel 83 to rotate and generate vibrations to inform the user. Once the user detects the vibrations, he/she may press down the plunger 50 to make the beveled edges 55 thereof to urge against the side protrusions 63 of the insert 60. In this way, the insert 60 will be retracted into the body and allow the cramp 10 with the mobile telephone 20 to be separated from the combined casing 30 and cover 40 in order that the user can hold the mobile phone in hand. In the same time, the downward pressing of the side protrusions 63 of the insert 60 and the upward movement of the cramp 10 will return the pivotable piece 84 to the OFF state to stop the vibrations generated by the eccentric wheel 83. Accordingly, the fastening in accordance with the present invention not only can provide the user with an excellent retention of the mobile telephone 20, but also can inform the user of an incoming telephone call with vibrations, instead of ringing.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mobile telephone fastening with vibration function comprising:

a cramp adapted to be attached by a mobile telephone and having a projection on a rear face thereof;

a casing having an outer face defining a longitudinal slot therein for receiving the projection of the cramp and an inner face having an inner wall defining a chamber, said chamber having a stop extending from a middle point thereof and communicating with the longitudinal slot;

a cover having a back face with a clip mounted thereto and a front face, said front face having a plurality of bosses extending therefrom to engage with a resilient strip, said resilient strip defining a large hole therein;

a plunger slidably and partly received within the chamber, said plunger having a button formed at an upper end thereof to be received within the chamber, said plunger defining a hole aligned with the stop of the casing and having two opposed protrusions integrally extending from an inner periphery defining the hole, the two opposed protrusions abutting a lower face of the stop of the casing to limit an upward movement of the plunger, a lower end of the plunger defining an inverted U-shaped cut-out which defines a bottom face and two side walls, said bottom face having a post extending downward therefrom for a spring to be mounted thereon, each of the two side walls of the cut-out forming a beveled edge;

an insert received within the passage of the casing, said insert having a slanted front face projecting from the outer face of the casing, a lug integrally formed on a rear face thereof and received in the plunger, and two side protrusions abutting the beveled edge of the plunger; and a printed circuit board, a battery, and a motor with an eccentric wheel respectively received in the casing and the cover, a pivotable piece mounted behind the printed circuit board, said pivotable piece extending into the chamber, the eccentric wheel being rotatable by the motor to impart a vibration.

2. A mobile telephone fastening with vibration function as claimed in claim 1, further comprising a test key mounted at a side wall thereof, said test key being coupled to the printed circuit board.

* * * * *